United States Patent [19]

Masuko et al.

[11] Patent Number: 5,150,230
[45] Date of Patent: Sep. 22, 1992

[54] ROD LENS FIXING METHOD AND FIBER COLLIMATOR MANUFACTURED THEREBY

[75] Inventors: Takayuki Masuko; Shunichi Satoh; Tetsuo Ishizaka; Toshio Ohya, all of Kawasaki, Japan

[73] Assignee: Fujitsu Limited, Kanagawa, Japan

[21] Appl. No.: 762,193

[22] Filed: Sep. 19, 1991

[30] Foreign Application Priority Data

| Sep. 20, 1990 | [JP] | Japan | 1-248671 |
| Oct. 17, 1990 | [JP] | Japan | 1-276302 |
| Oct. 17, 1990 | [JP] | Japan | 1-276305 |

[51] Int. Cl.⁵ .................................. G02B 7/26
[52] U.S. Cl. .................. 359/34; 385/33; 385/34
[58] Field of Search ........... 359/34, 811, 819, 652, 359/653, 654; 385/34, 33

[56] References Cited

U.S. PATENT DOCUMENTS

| 5,033,052 | 7/1991 | Masuko et al. | 372/36 |
| 5,046,798 | 9/1991 | Yaziu et al. | 385/34 |
| 5,068,865 | 11/1991 | Ohshima et al. | 385/34 |
| 5,073,047 | 12/1991 | Suzuki et al. | 385/93 |
| 5,074,682 | 12/1991 | Uno et al. | 385/33 |

FOREIGN PATENT DOCUMENTS

| 0282766 | 9/1988 | European Pat. Off. |
| 3822429 | 1/1990 | Fed. Rep. of Germany |
| 60-52807 | 3/1985 | Japan |
| 62-169112 | 7/1987 | Japan |
| 62-299811 | 12/1987 | Japan |

OTHER PUBLICATIONS

Patent Abstracts of Japan, vol. 12, No. 48 (P666), Feb. 13, 1988 and JP-A-62195613.
Patent Abstracts of Japan, vol. 12, No. 34 (P662), Feb. 2, 1988 and JP-A-62187309.
Patent Abstracts of Japan, vol. 15, No. 47 (P-1162) (4575), Feb. 5, 1991 and JP-A-2281212.
Patent Abstracts of Japan, vol. 15, No. 176 (P1198) May 7, 1991 and JP-A-4048605.

Primary Examiner—Janice A. Howell
Assistant Examiner—Kiet T. Nguyen
Attorney, Agent, or Firm—Nikaido, Marmelstein, Murray & Oram

[57] ABSTRACT

A rod lens fixing method which can prevent the generation of cracks in a rod lens due to annealing to be carried out after welding a lens assembly. The rod lens fixing method includes the steps of providing a flanged split sleeve having an axial slit extending continuously from one end of the flanged split sleeve to the other end thereof, the axial slit being wide enough at least a flange of the flanged split sleeve to permit laser welding; press-fitting the rod lens into the flanged split sleeve; and applying a solder into the axial slit to solder the rod lens to the flange split sleeve. This method further includes the steps of inserting the flanged split sleeve into a bore formed at one end portion of a sleeve, the bore having a diameter larger than an outer diameter of the flanged split sleeve and smaller than an outer diameter of the flange; and laser-welding the flange to one end surface of the sleeve at a plurality of points on an outer circumference of the flange and in the axial slit. The laser welding in the axial slit of the flange causes the acting of shrinkage forces in the flange to thereby prevent the generation of cracks in the rods lens during the annealing.

10 Claims, 12 Drawing Sheets

ROD LENS FIXING METHOD AND FIBER COLLIMATOR MANUFACTURED THEREBY

BACKGROUND OF THE INVENTION

1. Field of the Invention

The present invention relates to a rod lens fixing method for fixing a rod lens in a sleeve to be used for an optical semiconductor module or the like by means of soldering and laser welding.

2. Description of the Prior Art

In an optical communication system, for example, employing an optical fiber as an optical transmission line, an optical semiconductor module is used for the purpose of introducing an outgoing light from an optical semiconductor device such as a laser diode (LD) and a light emitting diode (LED) into the optical fiber. In the optical semiconductor module, the optical semiconductor device and an incident end surface of the optical fiber are fixed in a predetrmined positional relation, and a condensing lens is provided therebetween. In this kind of optical semiconductor module, a relative positional relation between components has a direct influence upon an optical coupling efficiency. Accordingly, it is required to position each component with a high accuracy, e.g., 1 μm or less. Moreover, it is also required to maintain such a positioning accuracy for a long period of time.

FIG. 1A is an elevational view of a lens assembly manufactured by a lens fixing method in the prior art, and FIG. 1B is a vertical sectional view of the lens assembly shown in FIG. 1A. Reference numeral 2 denotes a flanged split sleeve formed at its own end with a flange 4. The flanged split sleeve is formed of stainless steel or the like. A condensing rod lens 6 is press-fitted in the flanged split sleeve 2, and is fixed by solders 8 and 9 to the flanged split sleeve 2 at a portion of an axial slit 5 and opposite ends of the flanged split sleeve 2. To enable the rod lens 6 and the flanged split sleeve 2 to be welded together, an outer circumference of the rod lens 6 and a predetermined portion of the flanged split sleeve 2 are plated with gold. Thus, a lens assembly 10 is constructed. As shown in FIG. 2B, the lens assembly 10 is inserted into a stepped sleeve 12 from one end thereof, and as shown in FIG. 2A, the flange 4 is laser-welded to one end surface of the stepped sleeve 12 at four points P. On the other hand, a ferrule 14 connected to an optical fiber 16 is inserted into the stepped sleeve 12 from the other end thereof. After a relative positional relation between the rod lens 6 and the ferrule 14 in the stepped sleeve 12 is adjusted, the ferrule 14 is similarly laser-welded to the stepped sleeve 12. In this way, a fiber collimator (virtual fiber assembly) 18 is formed.

After the lens assembly 10 and the ferrule 14 are laser-welded to the stepped sleeve 12, annealing of the fiber collimator 18 is usually repeated for a long period of time, so as to remove stresses due to the laser welding. During this annealing, tensile forces act in the flange 4 of the flanged split sleeve 2 to expand the flange 4. As a result, the rod lens 6 is drawn in radially outward directions, causing the generation of cracks in the rod lens 6 as shown by arrows C in FIG. 2A from near the slit 5 of the flange 4.

SUMMARY OF THE INVENTION

It is therefore an object of the present invention to provide a rod lens fixing method which can prevent the generation of cracks in a rod lens.

It is another object of the present invention to provide a fiber collimator manufactured by a rod lens fixing method which can prevent the generation of cracks in a rod lens.

In accordance with an aspect of the present invention, there is provided a rod lens fixing method comprising the steps of providing a flanged split sleeve having an axial slit extending continuously from one end of the flanged split sleeve to other end thereof, the axial slit being wide enough at at least a flange of the flanged split sleeve to permit laser welding; press-fitting a rod lens into the flanged split sleeve; applying a solder into the axial slit to solder the rod lens to the flanged split sleeve; inserting the flanged split sleeve into a bore formed at one end portion of a sleeve, the bore having a diameter larger than an outer diameter of the flanged split sleeve and smaller than an outer diameter of the flange; and laser-welding the flange to one end surface of the sleeve at a plurality of points on an outer circumference of the flange and in the axial slit.

In accordance with other aspects of the present invention, there are provided rod lens fixing methods as mentioned below.

(1) A plurality of slits are formed in a flange of a flanged split sleeve in such a manner that at least a part of the slits extends in a circumferential direction of the flange. The flange is laser-welded to one end surface of a sleeve at a plurality of points on an outer circumference of the flange, the points lying on extensions of straight lines connecting a center line of the rod lens to substantially central portions of the circumferential slits formed in the flange.

(2) A plurality of radial slits are formed in a flange of a flanged split sleeve in such a manner as to be arranged in circumferentially spaced relationship from one another. The flange is laser-welded to one end surface of a sleeve at a plurality of points in the radial slits of the flange, each of the points being set on only one side of the respective radial slit.

(3) A plurality of first slits are formed in a flanged sleeve in such a manner as to extend from a flange formed at one axial end of the flanged sleeve to an axially intermediate portion thereof and be arranged in circumferentially spaced relationship from one another. Further, a plurality of second slits are formed in the flanged sleeve in such a manner as to extend from the other axial end of the flanged sleeve to the axially intermediate portion and be arranged in alternate relationship with respect to the first slits. The flange is laser-welded to one end surface of a sleeve at a plurality of points in the first slits of the flange, each of the points being set on only one side of the respective first slit.

(4) An outer circumferential surface of a rod lens is metallized, and thereafter, opposite ends of the rod lens are chamfered. The rod lens is press-fitted into a flanged split sleeve, and is soldered thereto. The flanged split sleeve is inserted into a bore of a sleeve, and a flange of the flanged split sleeve is laser-welded to one end surface of the sleeve at a plurality of points on an outer circumference of the flange.

(5) An axial groove is formed on an inner circumferential surface of a flanged split sleeve in such a manner as to extend in opposed relationship to an axial slit of the flanged split sleeve. A solder is applied into the axial slit and the axial groove to solder a rod lens to the flanged split sleeve. The flanged split sleeve is inserted into a bore of a sleeve, and a flange of the flanged split sleeve is laser-welded to one end surface of the sleeve at a plurality of points on an outer circumference of the flange.

(6) An outer circumferential surface of a rod lens is partially metallized at an axially central portion only thereof except at and near opposite ends of the rod lens. The rod lens is press-fitted into a flanged split sleeve, and is soldered thereto. The flanged split sleeve is inserted into a bore of a sleeve, and a flange of the flanged split sleeve is laser-welded to one end surface of the sleeve at a plurality of points on an outer circumference of the flange.

In accordance with a further aspect of the present invention, there is provided a fiber collimator comprising a stepped sleeve having opposite large-diameter portions and an intermediate small-diameter portion formed therebetween, the stepped sleeve having a first bore extending from one end thereof and a second bore extending from the other end thereof so as to communicate with the first bore; a lens assembly comprising a flanged split sleeve and a rod lens press-fitted in the flanged split sleeve and soldered thereto; and a fiber assembly comprising a ferrule and an optical fiber fixedly inserted in the ferrule; the fiber collimator being manufactured in accordance with the following steps of inserting the ferrule into the second bore of the stepped sleeve; fixing an outer circumference of the ferrule to the other end of the stepped sleeve at a plurality of points by means of first laser welding; inserting the lens assembly into the first bore of the stepped sleeve; fixing an outer circumference of a flange of the flanged split sleeve to the one end of the stepped sleeve at a plurality of points be means of second laser welding; and penetrating the small-diameter portion of the stepped sleeve at a plurality of points by means of third laser welding to fix the small-diameter portion to the ferrule by means of the third laser welding.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1A:
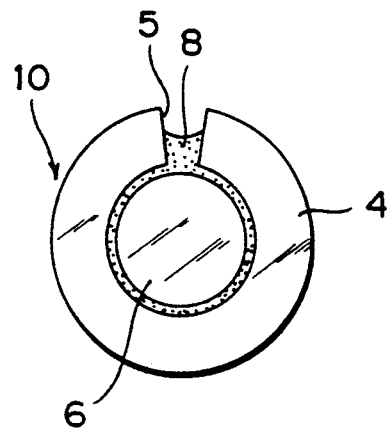
FIG. 1A is an elevational view of a lens assembly fixed by a conventional method.
Figure 1B:
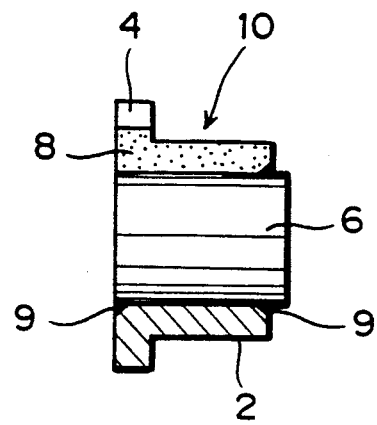
FIG. 1B is a vertical sectional view of the lens assembly shown in FIG. 1A.
Figure 2A:
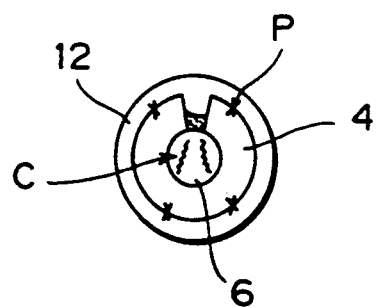
FIG. 2A is an elevational view of a fiber collimator manufactured by a conventional method.
Figure 2B:
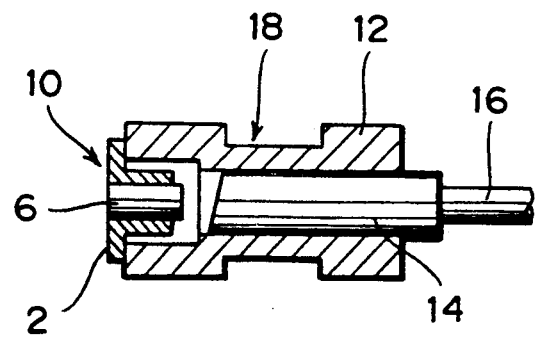
FIG. 2B is a vertical sectional view of the fiber collimator shown in FIG. 2A.
Figure 3:
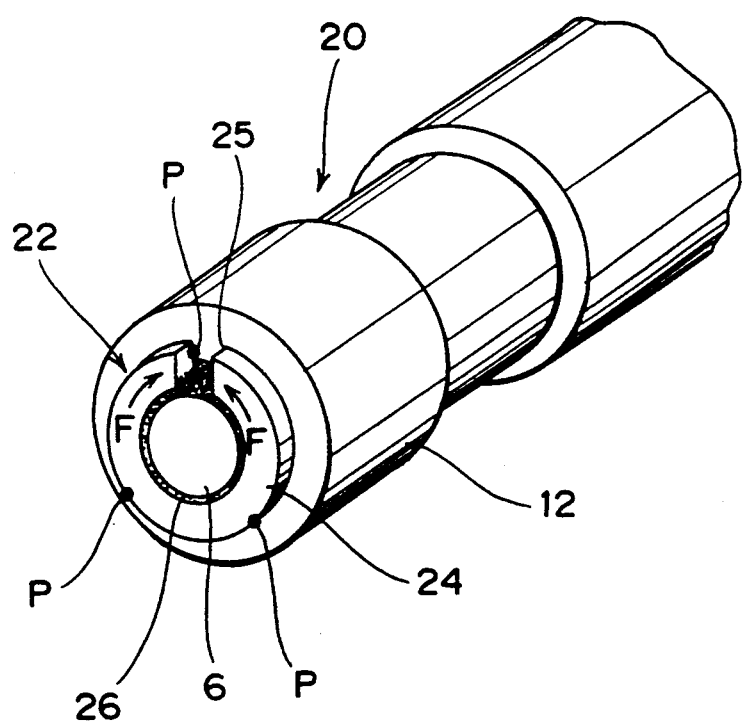
FIG. 3 is a perspective view of a first preferred embodiment of the present invention.

Referring first to FIG. 3, there is shown a perspective view of a fiber collimator (virtual fiber assembly) 20 adopting a lens fixing method according to a first preferred embodiment of the present invention. Reference numeral 22 denotes a lens assembly comprising a condensing rod lens 6 and a flanged split sleeve 23 integrally formed at its one end with a flange 24. The rod lens 6 is press-fitted in the flanged split sleeve 23, and is fixed thereto by a solder 26. In this lens assembly 22, a slit 25 of the flange 24 is so wide as to permit spot welding.

A sleeve portion of the lens assembly 22 is inserted into a stepped sleeve 12, and the flange 24 of the lens assembly 22 is laser-welded to one end surface of the stepped sleeve 12 at two points P in the wide slit 25 and the other two lower points P on the outer circumference of the flange 24. Thus, the lens assembly 22 is fixed in the stepped sleeve 12 to form the fiber collimator 20. As the flange 24 is laser-welded to the stepped sleeve 12 at the two points P in the slit 25, tensile forces act in the flange 24 in the directions depicted by arrows F during annealing to be carried out after the welding step. As a result, shrinkage forces act in the rod lens 6 near the slit 25 during annealing to prevent the generation of cracks in the rod lens 6 from near the slit 25.

Figure 4:
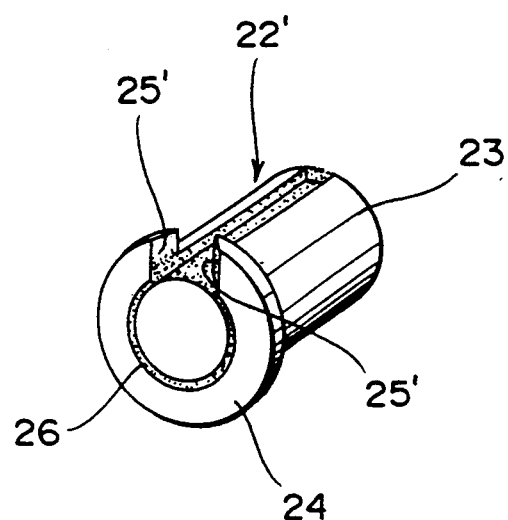
FIG. 4 is a perspective view of a modification of the first preferred embodiment.
Figure 5:
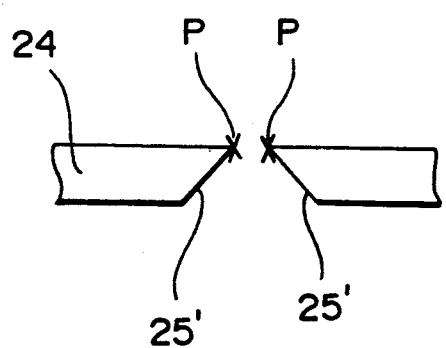
FIG. 5 is a schematic view illustrating a slit formed in a flange according to the modification shown in FIG. 4.

Referring to FIG. 4, there is shown a perspective view of a lens assembly 22' according to a modification of the first preferred embodiment described above. In this modification, a wide slit 25' of the flange 24 is tapered. Such a tapered shape of the wide slit 25' of the flange 24 improves the workability of laser welding at the points P as shown in FIG. 5.

Figure 6:
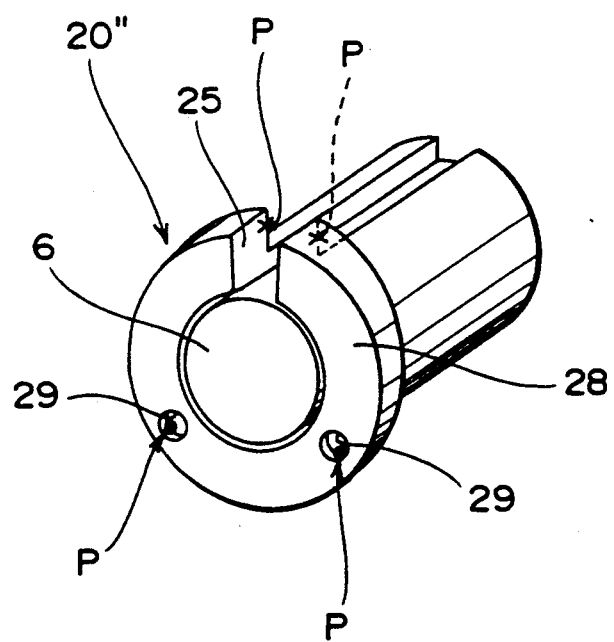
FIG. 6 is a perspective view of another modification of the first preferred embodiment.

Referring to FIG. 6, there is shown a perspective view of a lens assembly 20" according to another modification of the first preferred embodiment. In this modification, a flange 28 is so tapered as to be gradually thinned as the circumferential distance from the wide slit 25 increases. Further, two through holes 29 are formed through a thin-walled portion of the flange 28. The flange 28 is laser-welded to one end surface of the stepped sleeve at two points P in the through holes 29 in addition to two points P in the slit 25, thereby fixing the lens assembly 20" in the stepped sleeve. The two points P in the through holes 29 where the laser welding is carried out are set on the outside in the radial direction of the flange 28, so as to prevent the generation of tensile forces acting in the flange 28 in the radially outward directions thereof and thereby prevent the generation of cracks in the rod lens 6.

Figure 7:
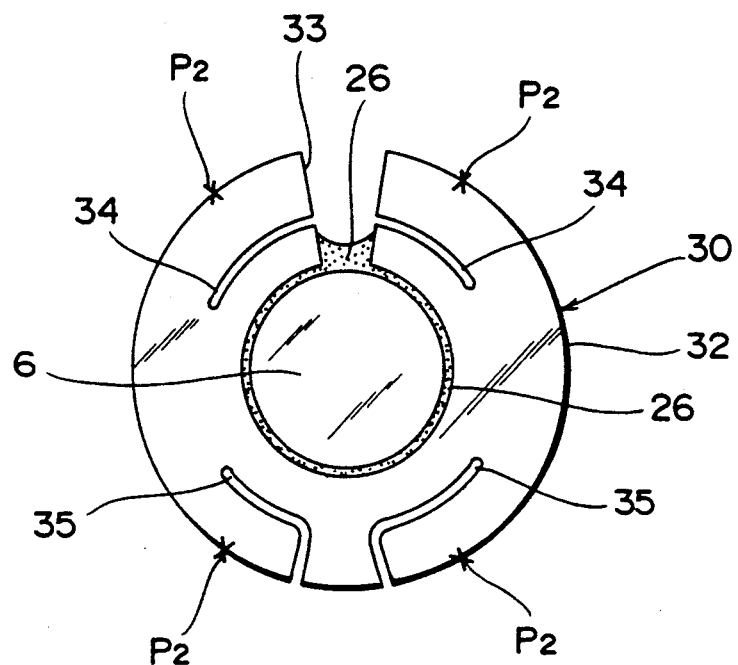
FIG. 7 is an elevational view of a lens assembly according to a second preferred embodiment of the present invention.
Figure 8:
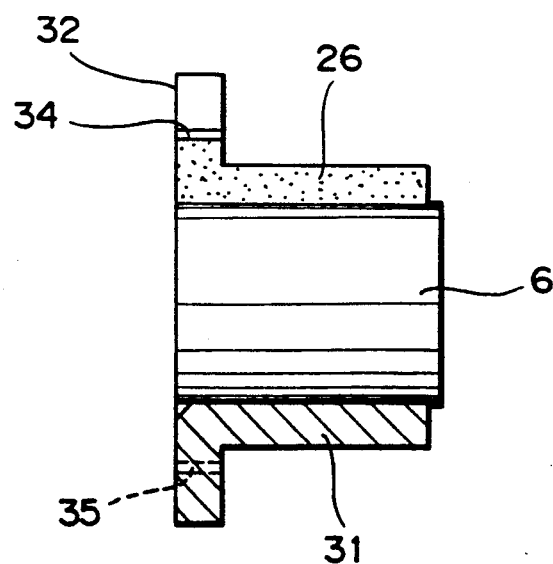
FIG. 8 is a vertical sectional view of the lens assembly shown in FIG. 7.

Referring next to FIGS. 7 and 8, a lens assembly 30 according to a second preferred embodiment of the present invention will be described. A flange 32 of a flanged split sleeve 31 is formed with a pair of slits 34 extending circumferentially from an axial slit 33 and a pair of slits 35 extending radially inwardly from the outer circumference of the flange 32 on the opposite side of the axial slit 33 and further extending circumferentially from the radially inward ends of the radial slit portions in the opposite directions. The rod lens 6 is press-fitted in the flanged split sleeve 31, and is fixed thereto by the solder 26 to form the lens assembly 30.

Figure 9:
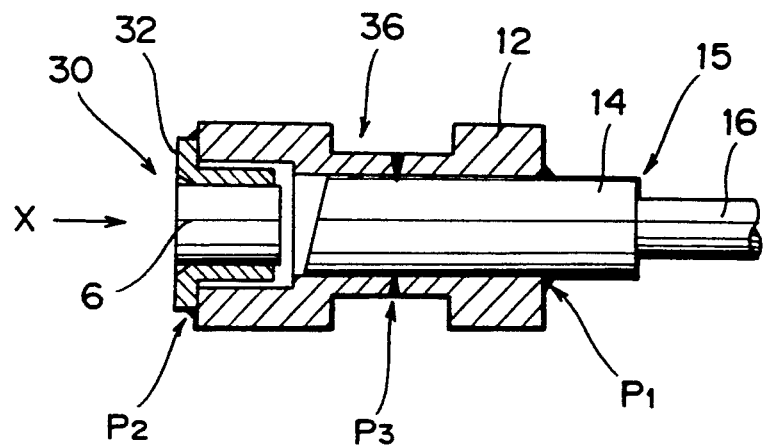
FIG. 9 is a vertical sectional view of a fiber collimator manufactured by the method according to the second preferred embodiment.
Figure 10:
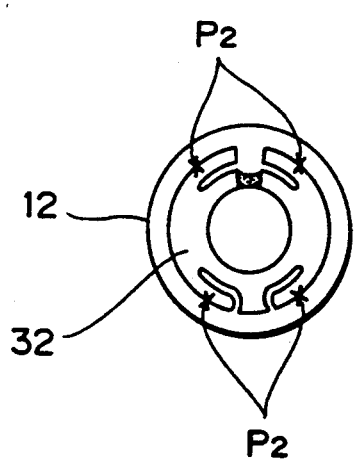
FIG. 10 is an elevational view of the fiber collimator taken in the direction of arrow X in FIG. 9.

A sleeve portion of the lens assembly 30 thus formed is inserted into the stepped sleeve 12 from one end thereof as shown in FIG. 9, and the flange 32 of the lens assembly 30 is laser-welded to one end surface of the stepped sleeve 12 at four points $P_2$ as shown in FIG. 10. On the other hand, a ferrule 14 of a fiber assembly 15 is inserted into the stepped sleeve 12 from the other end thereof. The fiber assembly 15 is constructed of the ferrule 14 and an optical fiber 16 fixedly inserted in the ferrule 14. After a relative positional relation between the lens assembly 30 and the fiber assembly 15 is adjusted, the fiber assembly 15 is laser-welded to the other end surface of the stepped sleeve 12 at four points $P_1$ circumferentially spaced at 90° from one another.

In the various embodiment described herein, the order of the laser welding to be carried out at the various points is to be noted. That is, the ferrule 14 of the fiber assembly 15 is first laser-welded at the four points $P_1$. Secondly, the lens assembly 30 is laser-welded at the four points $P_2$. Finally, a thin-walled portion of the stepped sleeve 12 is penetrated by a laser beam at two points $P_3$ to be laser-welded to ferrule 14. Thus, a fiber collimator (virtual fiber assembly) 36 is completed.

As described above, the flange 32 is formed with the slits 34 and 35, and the flange 32 is laser-welded to the one end surface of the stepped sleeve 12 at the four points $P_2$. Accordingly, tensile forces acting in the flange 32 in the radially outward directions during annealing after the welding step is absorbed by the slits 34 and 35. As a result, tensile forces acting in the rod lens 6 is relaxed, thereby preventing the generation of cracks in the rod lens 6. Furthermore, in assembling the fiber collimator 36, the laser welding at the points $P_3$ is carried out in the final stage. Accordingly, in annealing the fiber collimator 36, shrinkage forces act in the stepped sleeve 12, thereby preventing the generation of cracks in the rod lens 6.

Figure 11:
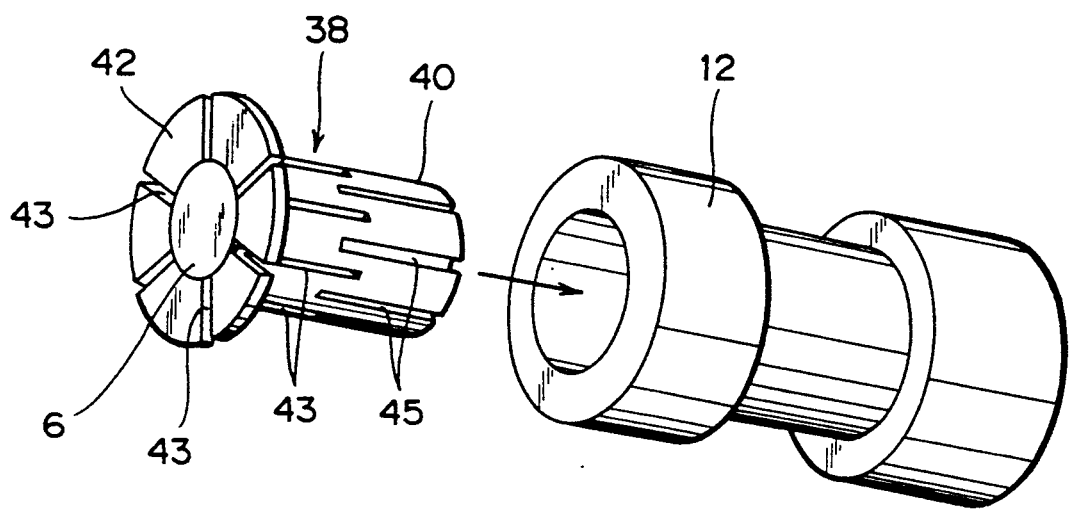
FIG. 11 is a perspective view of a third preferred embodiment of the present invention.

Referring to FIG. 11, there is shown a lens assembly 38 according to a third preferred embodiment of the present invention. A flanged sleeve 40 of the lens assembly 38 is formed with a plurality of slits 43 extending radially of a flange 42 and extending axially of a sleeve portion of the flanged sleeve 40 continuously from the radial slits of the flange 42 to an intermediate position of the sleeve portion of the flanged sleeve 40. The flanged sleeve 40 is further formed with a plurality of slits 45 axially extending from the other end on the opposite side of the flange 42 to the intermediate position of the sleeve portion in such a manner that the slits 45 are arranged in alternate relationship with respect to the slits 43.

In constructing the lens assembly 38, the rod lens 6 is press-fitted into the flanged sleeve 40, and a solder is poured into the slits 43 and 45 to fix the rod lens 6. During cooling of the solder, tensile stresses act in the rod lens 6 between the adjacent slits 43 and between the adjacent slits 45 due to a difference in coefficient of thermal expansion of materials can be reduced. For example, assuming that each number of the slits 43 and 45 is n, the tensile stresses can be reduced to 1/n times those in the case of one slit.

As the tensile stresses acting in the rod lens 6 are reduced for the above reason, the generation of cracks in the rod lens 6 can be prevented in constructing the lens assembly 38.

Figure 12:
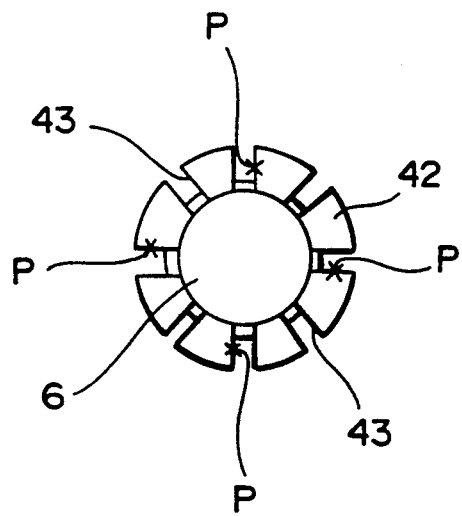
FIG. 12 is an elevational view of the lens assembly shown in FIG. 11, illustrating a welding method according to the third preferred embodiment.

The sleeve portion of the lens assembly 38 is inserted into the stepped sleeve 12, and the flange 42 of the lens assembly 38 is laser-welded to one end surface of the stepped sleeve 12. In the welding step, the flange 42 is laser-welded at four points P in some of the slits 43 of the flange 42 on the only one side of each slit 43 as shown in FIG. 12. In this manner, each point P of the laser welding is set on the only one side of each slit 43 of the flange 42. Therefore, stresses due to shrinkage of the welded portions upon annealing can be made almost zero.

Figure 13:
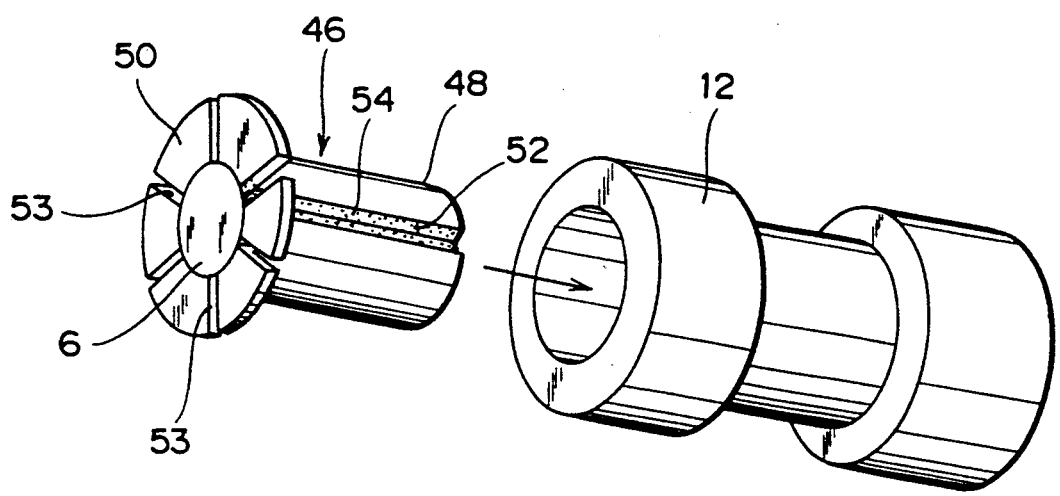
FIG. 13 is a perspective view of a fourth preferred embodiment of the present invention.
Figure 14:
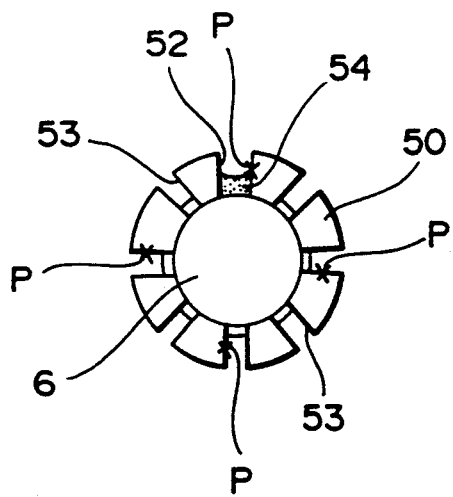
FIG. 14 is an elevational view of the lens assembly shown in FIG. 11, illustrating a welding method according to the fourth preferred embodiment.

Referring to FIG. 13, there is shown a lens assembly 46 according to a fourth preferred embodiment of the present invention. A flanged split sleeve 48 is formed with an axially extending slit 52. A flange 50 of the flanged split sleeve 48 is formed with a plurality of radially extending slits 53 arranged in circumferentially spaced relationship from one another. The rod lens 6 is press-fitted into the flanged split sleeve 48, and a solder 54 is poured into the slit 52 to fix the rod lens 6, thus forming the lens assembly 46. Then, a sleeve portion of the lens assembly 46 is inserted into the stepped sleeve 12, and the flange 50 of the lens assembly 46 is laser-welded to one end surface of the stepped sleeve 12 in the same manner as that in the third preferred embodiment. That is, as shown in FIG. 14, the flange 50 is laser-welded to the stepped sleeve 12 at four points P in the slit 52 and some of the slits 53 of the flange 50 on the only one side of each slit. In this manner, each point P of the laser welding is set on the only one side of each slit of the flange 50. Therefore, stresses due to shrinkage of the welded portions upon annealing can be made almost zero.

Figure 15:
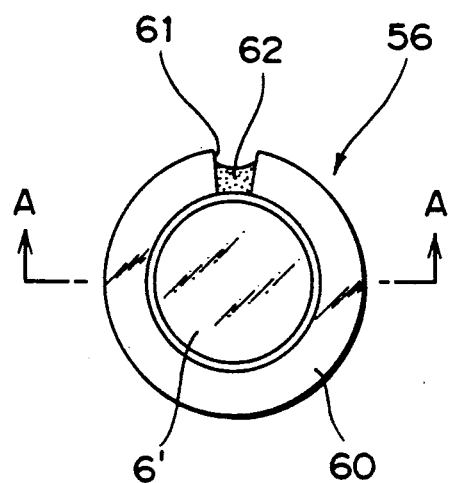
FIG. 15 is an elevational view of a fifth preferred embodiment of the present invention.
Figure 16:
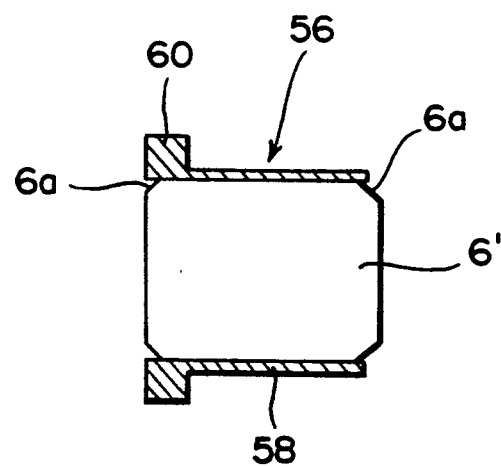
FIG. 16 is a cross section taken along the line A—A in FIG. 15.

Referring to FIGS. 15 and 16, a lens fixing method according to a fifth preferred embodiment of the present invention will now be described. Reference numeral 58 denotes a flanged split sleeve integrally formed with a flange 60. A condensing rod lens 6' is press-fitted in the flange split sleeve 58, and is fixed thereto by soldering. The flanged split sleeve 58 is formed of stainless steel, and a gold plating for enabling the soldering is therefore formed on the inner circumferential surface of the sleeve 58. Similarly, the outer circumferential surface of the rod lens 6' is also plated with gold so as to enable the soldering. Further, edge portions 6a of the opposite ends of the rod lens 6' are chamfered after plated with gold. As the edge portions 6a are chamfered, the rod lens 6' is fixed to the flanged split sleeve 58 primarily by a solder 62 poured into a slit 61 of the sleeve 58. Thus a lens assembly 56 is constructed.

Then, the lens assembly 56 is inserted into the stepped sleeve 12 as shown in FIG. 9, and is fixed thereto by laser welding, thus constructing a fiber collimator. In annealing the fiber collimator, tensil forces act in the flange 60 in the radially outward directions thereof. However, as the edge portions 6a of the rod lens 6' are chamfered, the tensil forces are not applied directly to the rod lens 6' thereby preventing the generation of cracks in the rod lens 6'.

Figure 17:
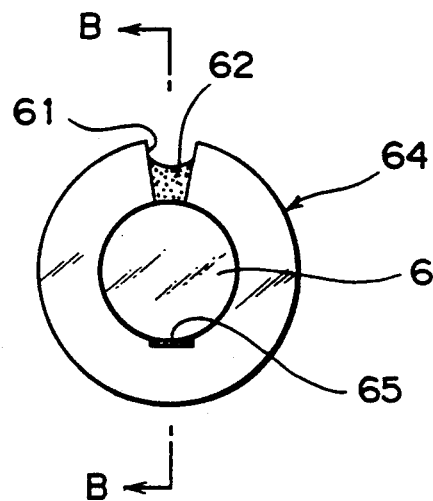
FIG. 17 is an elevational view of a sixth preferred embodiment of the present invention.
Figure 18:
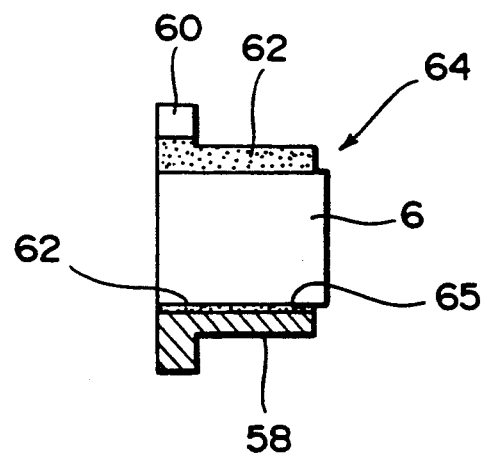
FIG. 18 is a cross section taken along the line B—B in FIG. 17.

Referring to FIGS. 17 and 18, a lens fixing method according to a sixth preferred embodiment of the present invention will now be described. In this preferred embodiment, an axially extending groove 65 is formed on the inner circumferential surface of the flanged split sleeve 58 on the opposite side of the slit 61. A gold plating is formed on the inner wall of the groove 65 only. The rod lens 6 is press-fitted into the flanged split sleeve 58, and the solder 62 is poured into the slit 61 and the groove 65 to thereby fix the rod lens 6 in the flanged split sleeve 58. Thus, a lens assembly 64 is constructed.

Then, the lens assembly 64 is inserted into the stepped sleeve 12 as shown in FIG. 9, and is fixed thereto by laser welding, thus constructing a fiber collimator. In annealing the fiber collimator, tensile forces act in the flange 60 in the radially outward directions thereof. However, as the rod lens 6 is fixed to the flanged split sleeve by the solder 62 in the slit 61 and the groove 65 only, the tensile forces are not applied directly to the rod lens 6, thereby preventing the generation of cracks in the rod lens 6.

Figure 19:
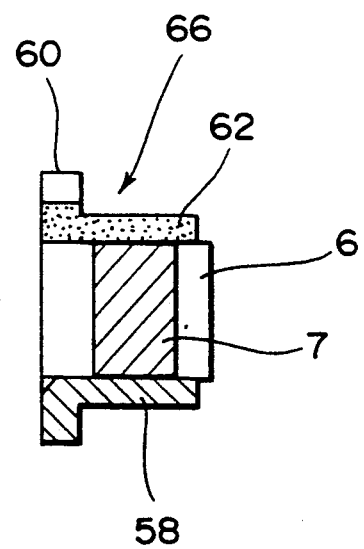
FIG. 19 is a vertical sectional view of a seventh preferred embodiment of the present invention.

Referring to FIG. 19, a lens fixing method according to a seventh preferred embodiment of the present invention will now be described. In this preferred embodiment, a gold plating 7 is formed on the outer circumferential surface of the rod lens 6 at its axially central portion only. In other words, no gold plating is formed at and near the opposite end portions of the outer circumferential surface of the rod lens 6. On the other hand, the inner circumferential surface of the flanged split sleeve 58 is entirely plated with gold. The rod lens 6 is press-fitted into the flanged split sleeve 58, and is fixed thereto by the solder 62. As the gold plating 7 is not formed at and near the opposite end portions of the outer circumferential surface of the rod lens 6, but is formed at the axially central portion only, the rod lens 6 is soldered to the flanged split sleeve 58 at the axially central portion only of the rod lens 6. Thus, a lens assembly 66 is constructed.

Then, the lens assembly 66 is inserted into the stepped sleeve 12 as shown in FIG. 9, and is fixed thereto by laser welding, thus constructing a fiber collimator. In annealing the fiber collimator, tensile forces act in the flange 60 in the radially outward directions thereof. However, as the rod lens 6 is fixed by soldering at its axially central portion only to the flanged split sleeve 58, the tensile forces are not applied directly to the rod lens 6, thereby preventing the generation of cracks in the rod lens 6.

Figure 20:
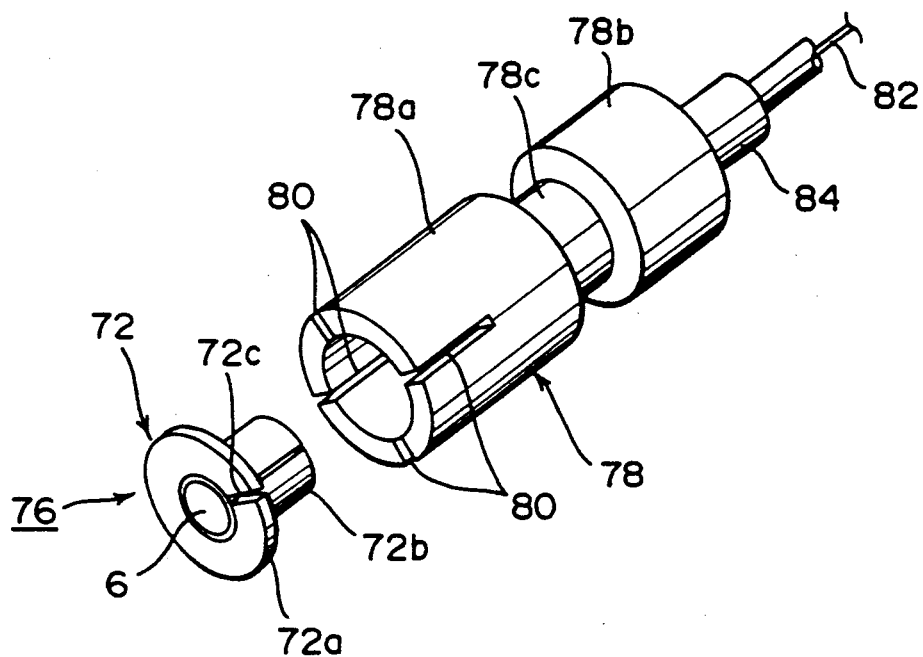
FIG. 20 is an exploded perspective view of a fiber collimator according to an eighth preferred embodiment of the present invention.
Figure 21:
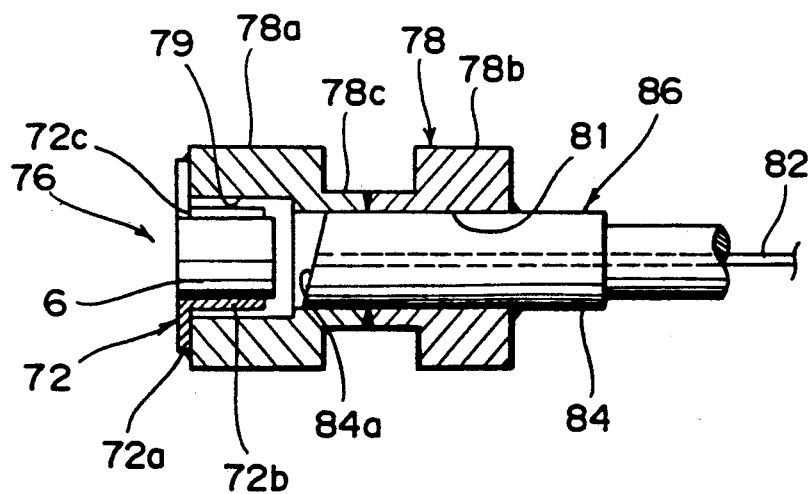
FIG. 21 is a vertical sectional view of the fiber collimator shown in FIG. 20.

Referring to FIGS. 20 and 21, a fiber collimator manufactured by a fixing method according to an eighth preferred embodiment of the present invention will now be described.

Reference numeral 72 denotes a flanged split sleeve integrally formed with a flange 72a. The flanged split sleeve 72 is formed with an axial slit 72c extending from one end having the flange 72a over the full length of a lens receiving portion 72b. The flange split sleeve 72 is formed of stainless steel for permitting laser welding. A solderable metal film such as a gold film is formed on the outer circumferential surface of the rod lens 6 and the inner circumferential surface of the flanged split sleeve 72. The rod lens 6 is pressed-fitted into the flanged split sleeve 72, and is fixed thereto by soldering. Thus, a lens assembly 76 is constructed.

Reference numeral 78 denotes a stepped sleeve for receiving the lens assembly 76 and fixing the same therein. The stepped sleeve 78 has opposite large-diameter portions 78a and 78b and an intermediate small-diameter portion 78c formed therebetween. The stepped sleeve 78 is formed with a large-diameter bore 79 at one end portion thereof and with a small-diameter bore 81 at the other end portion so as to communicate with the large-diameter bore 79. The stepped sleeve 78 is formed of stainless steel for permitting laser welding. The large-diameter portion 78a of the stepped sleeve 78 is formed with a plurality of axial slits 80 extending from one end of the sleeve 78 in such a manner that the slits 80 are arranged at circumferentially equal intervals.

Reference numeral 86 denotes a fiber assembly comprising a ferrule 84 and an optical fiber 82 fixedly inserted in the ferrule 84. The fiber assembly 86 is fixedly inserted in the small-diameter bore 81 of the stepped sleeve 78. An end surface 84a of the ferrule 84 opposed to an inside end surface of the rod lens 6 is inclined with respect to a plane vertical to a center line of the optical fiber 82, so that a reflected light from the end surface 84a is introduced in a direction different from that of an incoming optical path.

The fiber collimator according to the preferred embodiment is manufactured in accordance with the following procedure. First, the rod lens 6 is fixedly inserted into the flanged split sleeve 72 form the lens assembly 76. On the other hand, the fiber assembly 86 having the ferrule 84 and the optical fiber 82 integrated together is inserted into the small-diameter bore 81 of the stepped sleeve 78, and the end surface of the large-diameter diameter portion 78b of the stepped sleeve 78 is laser-welded to the outer circumferential surface of the ferrule 84 at four points. Then, the lens assembly 76 is inserted into the large-diameter bore 79 of the stepped sleeve 78, and a relative position between the end surface of the optical fiber 82 and the rod lens 6 is adjusted. Thereafter, the flange 72a of the flanged split sleeve 72 of the lens assembly 76 is laser-welded to the end surface of the large-diameter portion 78a of the stepped sleeve 78 by irradiating a laser beam at our points of the outer circumference of the flange 72a.

Then, the small-diameter portion 72c of the stepped sleeve 78 is penetrated at four points by a laser beam to be welded to the ferrule 84. Finally, the slits 80 of the stepped sleeve 78 are spot-welded at positions preferably on the lens assembly 76 side with respect to the axially central positions of the slits 80. The reason why the spot welding is carried out at such positions is that shrinkage forces at the spot-welded portions of the slits 80 are readily applied to the flange 72a.

In the fiber collimator manufactured by the above method, shrinkage forces act in the stepped sleeve 78 by the laser welding carried out through the small-diameter portion 78c of the stepped sleeve 78. Furthermore, the shrinkage forces at the spot-welded portions of the slits 80 act in the stepped sleeve 78 in such directions as to reduced the diameter of the stepped sleeve 78 on the flange 72a side of the lens assembly 76. Accordingly, in annealing the fiber collimator, tensile forces acting in the flange 72a are relaxed by these shrinkage forces, thereby preventing the generation of cracks in the rod lens 6.

What is claimed is:

1. A rod lens fixing method comprising the steps of:
   providing a flanged split sleeve having an axial slit extending continuously from one end of said flanged split sleeve to the other end thereof, said axial slit being wide enough at at least a flange of said flanged split sleeve to permit laser welding;
   press-fiiting a rod lens into said flanged split sleeve;
   applying a solder into said axial slit to solder said rod lens to said flanged split sleeve;
   inserting said flanged split sleeve into a bore formed at one end portion of a sleeve, said bore having a diameter larger than outer diameter of said flanged split sleeve and smaller than an outer diameter of said flange; and
   laser-welding said flange to one end surface of said sleeve at a plurality of points on an outer circumference of said flange and in said axial slit.

2. The rod lens fixing method according to claim 1, wherein said flange of said flange split sleeve is gradually thined as a circumferential distance from said axial slit increases; at least one hole is formed through a thin-walled portion of said flange; and said flange is laser-welded through said hole to said one end surface of said sleeve.

3. A rod lens fixing method comprising the steps of:
   providing a flanged split sleeve having an axial slit extending continuously from one end of said flanged split sleeve to the other end thereof;
   forming a plurality of slits in said flange of said flanged split sleeve, at least a part of said slits extending in a circumferential direction of said flange;
   press-fitting a rod lens into said flanged split sleeve;
   applying a solder into said axial slit to solder said rod lens to said flanged split sleeve;
   inserting said flanged split sleeve into a bore formed at one end portion of a sleeve, said bore having a diameter larger than an outer diameter of said flanged split sleeve and smaller than an outer diameter of said flange; and
   laser-welding said flange to one end surface of said sleeve at a plurality of points on an outer circumference of said flange, said points lying on extensions of straight lines connecting a center line of said rod lens to substantially central portions of said circumferential slits formed in said flange.

4. A rod lens fixing method comprising the steps of:
   providing a flanged split sleeve having an axial slit extending continuously from one end of said flanged split sleeve to the other end thereof, said flange being formed with a plurality of radial slits arranged in circumferentially spaced relationship from one another;
   press-fitting a rod lens into said flanged split sleeve;
   applying a solder into said axial slit to solder said rod lens to said flanged split sleeve;
   inserting said flanged split sleeve into a bore formed at one end portion of a sleeve, said bore having a diameter larger than an outer diameter of said flanged split sleeve and smaller than an outer diameter of said flange; and
   laser-welding said flange to one end surface of said sleeve at a plurality of points in said radial slits of said flange, each of said points being set on only one side of said respective radial slit.

5. A rod lens fixing method comprising the steps of:
   providing a flanged sleeve having a plurality of first slits extending from a flange formed at one axial end of said flanged sleeve to an axially intermediate portion thereof, said first slits being arranged in circumferentially spaced relationship from one another, and also having a plurality of second slits extending from the other axial end of said flanged sleeve to said axially intermediate portion, said second slits being arranged in alternate relationship with respect to said first slits;
   press-fitting a rod lens into said flanged sleeve;
   applying a solder into said first slits and said second slits to solder said rod lens to said flanged sleeve;
   inserting said flanged sleeve into a bore formed at one end portion of a sleeve, said bore having a diameter larger than an outer diameter of said flanged sleeve and smaller than an outer diameter of said flange; and
   laser-welding said flange to one end surface of said sleeve at a plurality of points in said first slits of said flange, each of said points being set on only one side of said respective first slit.

6. A rod lens fixing method comprising the steps of:
   providing a flanged split sleeve having an axial slit extending continuously from one end of said flanged split sleeve to the other end thereof, said axial slit being wide enough at at least a flange of said flanged split sleeve to permit laser welding;
   metallizing an outer circumferential surface of a rod lens;
   chamfering opposite ends of said rod lens;
   press-fitting said rod lens into said flanged split sleeve;
   applying a solder into said axial slit to solder said rod lens to said flanged split sleeve;
   inserting said flanged split sleeve into a bore formed at one end portion of a sleeve, said bore having a diameter larger than an outer diameter of said flanged split sleeve and smaller than an outer diameter of a flange of said flanged split sleeve; and
   laser-welding said flange to one end surface of said sleeve at a plurality of points on an outer circumference of said flange and in said axial slit.

7. A rod lens fixing method comprising the steps of:
   providing a flanged split sleeve having an axial slit extending continuously from one end of said flanged split sleeve to the other end thereof, an inner circumferential surface of said flanged split sleeve being formed with an axial groove extending in opposed relationship to said axial slit;
   press-fitting a rod lens into said flanged split sleeve;
   applying a solder into said axial slit and said axial groove to solder said rod lens to said flanged split sleeve;

inserting said flanged split sleeve into a bore formed at one end portion of a sleeve, said bore having a diameter larger than an outer diameter of said flanged split sleeve and smaller than an outer diameter of a flange of said flanged split sleeve; and laser-welding said flange to one end surface of said sleeve at a plurality of points on an outer circumference of said flange.

8. A rod lens fixing method comprising the steps of:

providing a flanged split sleeve having an axial slit extending continuously from one end of said flanged split sleeve to the other end thereof, said axial slit being wide enough at-least a flange of said flanged split sleeve to permit laser welding;

metallizing an outer circumferential surface of a rod lens at an axially central portion only thereof except at and near opposite ends of said rod lens;

press-fitting said rod lens into said flanged split sleeve;

applying a solder into said axial slit to solder said rod lens to said flanged split sleeve;

inserting said flanged split sleeve into a bore formed at one end portion of a sleeve, said bore having a diameter larger than an outer diameter of said flanged split sleeve and smaller than an outer diameter of a flange of said flanged split sleeve; and laser-welding said flange to one end surface of said sleeve at a plurality of points on an outer circumference of said flange and in said axial slit.

9. A fiber collimator comprising a stepped sleeve having opposite large-diameter portions and an intermediate small-diameter portion formed therebetween, said stepped sleeve having a first bore extending from one end thereof and a second bore extending from the other end thereof so as to communicate with said first bore; a lens assembly comprising a flanged split sleeve and a rod lens press-fitted in said flanged split sleeve and soldered thereto; and a fiber assembly comprising a ferrule and an optical fiber fixedly inserted in said ferrule; said fiber collimator being manufactured in accordance with the following steps of:

inserting said ferrule into said second bore of said stepped sleeve;

fixing an outer circumference of said ferrule to said other end of said stepped sleeve at a plurality of points by means of first laser welding;

inserting said lens assembly into said first bore of said stepped sleeve;

fixing an outer circumference of a flange of said flanged split sleeve to said one end of said stepped sleeve at a plurality of points by means of second laser welding; and penetrating said small-diameter portion of said stepped sleeve at a plurality of points by means of third laser welding to fix said small-diameter portion to said ferrule by means of said third laser welding.

10. The fiber collimator according to claim 9, wherein one of said large-diameter portions formed on the side of said one end of said stepped sleeve is formed with a plurality of axial slits extending from said one end and arranged in circumferentially spaced relationship from one another, and said axial slits are welded by means of fourth laser welding after said third laser welding.

* * * * *